United States Patent
Park et al.

(10) Patent No.: US 8,904,890 B2
(45) Date of Patent: Dec. 9, 2014

(54) MOVING DEVICE

(75) Inventors: Hyun Sung Park, Seoul (KR); In Sung Chang, Gyeonggi-do (KR); Jung Whan Yeum, Seoul (KR)

(73) Assignee: Hyundai Motor Company, Seoul (KR)

( * ) Notice: Subject to any disclaimer, the term of this patent is extended or adjusted under 35 U.S.C. 154(b) by 273 days.

(21) Appl. No.: 13/562,886

(22) Filed: Jul. 31, 2012

(65) Prior Publication Data

US 2013/0139622 A1 Jun. 6, 2013

(30) Foreign Application Priority Data

Dec. 6, 2011 (KR) .................. 10-2011-0129635

(51) Int. Cl.
*F16H 3/06* (2006.01)
*F16H 27/02* (2006.01)
*F16H 29/02* (2006.01)
*F16H 29/20* (2006.01)

(52) U.S. Cl.
USPC ........................... 74/89.39; 74/89.33

(58) Field of Classification Search
CPC ..... F16H 25/20; F16H 25/2204; F16H 25/24; F16H 2025/204; F16H 25/2454; F16H 25/22; H02K 7/1125; F16D 2125/40; F16D 2129/08; F16D 65/14

USPC ............ 74/89.23, 89.32, 89.33, 89.34, 89.39; 418/32, 220, 270

See application file for complete search history.

(56) References Cited

U.S. PATENT DOCUMENTS

| 3,161,074 | A | * | 12/1964 | Korthaus et al. | 74/89.34 |
| 4,434,974 | A | * | 3/1984 | LaCount | 254/360 |
| 5,499,547 | A | * | 3/1996 | Nagai et al. | 74/89.34 |
| 6,142,030 | A | * | 11/2000 | Nagai et al. | 74/89.32 |
| 2007/0220998 | A1 | * | 9/2007 | Kopecek | 74/89.39 |
| 2010/0139427 | A1 | * | 6/2010 | Yamaguchi et al. | 74/89.33 |

FOREIGN PATENT DOCUMENTS

| JP | 9240516 A | 9/1997 |
| JP | 11183672 A | 7/1999 |
| JP | 2002027732 A | 1/2002 |
| KR | 1991-0000177 B | 1/1991 |
| KR | 20-0131649 Y | 5/1999 |
| KR | 10-2000-0062299 A | 10/2000 |
| KR | 10-2001-0101213 A | 11/2001 |
| KR | 10-2008-0042796 | 5/2008 |

* cited by examiner

*Primary Examiner* — Justin Krause
(74) *Attorney, Agent, or Firm* — Edwards Wildman Palmer LLP; Peter F. Corless

(57) ABSTRACT

A moving device is disclosed. A moving device includes a driving unit comprising a rotary shaft that is rotatable in a forward direction and a reverse direction by air pressure, a power delivery unit connected to the rotary shaft and adapted and configured to convert rotary motion of the rotary shaft to linear motion.

8 Claims, 6 Drawing Sheets

FIG. 6
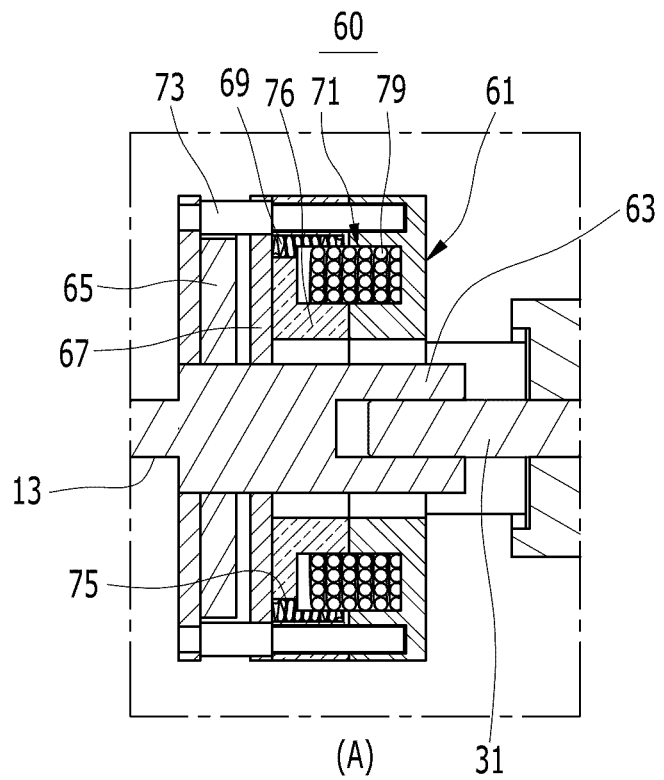
(A)
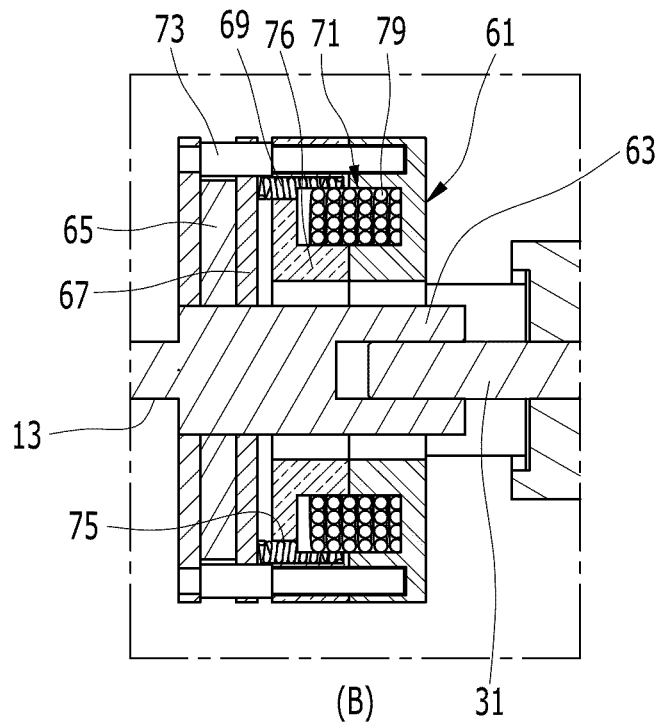
(B)

MOVING DEVICE

CROSS-REFERENCE TO RELATED APPLICATION

This application claims priority to and the benefit of Korean Patent Application No. 10-2011-0129635 filed in the Korean Intellectual Property Office on Dec. 6, 2011, the entire contents of which are incorporated herein by reference.

FIELD OF THE INVENTION

The present invention relates to a moving device. More particularly, the present invention relates to a moving device which can be adapted to move a moving object such as a jig in a vehicle body assemble line.

BACKGROUND OF THE INVENTION

Generally, after being manufactured through various press apparatus, panels are transmitted to a vehicle body factory at a first stage of vehicle manufacturing process. The panels are assembled with each other so as to form a vehicle body of a body in white (B.I.W.) shape.

After the panels of the vehicle body are formed to have a predetermined shape through various press apparatus by pressure, the panels are cut, drilled, bent, or curved at press process such as trimming, piercing, flanging, hemming, and so on.

In a vehicle body assembly line, a moving device is provided for moving a moving object such as a panel arrange apparatus, a clamping apparatus an so on.

In a conventional art, a moving device converts rotary motion of an electrical motor to linear motion for moving the object linearly.

However, in the conventional art, an electrical motor are used as a driving unit and thus, the entire moving device is complex and cost for plant and equipment investment is relatively high.

The above information disclosed in this Background section is only for enhancement of understanding of the background of the invention and therefore it can contain information that does not form the prior art that is already known in this country to a person of ordinary skill in the art.

SUMMARY OF THE INVENTION

The present invention has been made in an effort to provide a moving device, which can be adapted to move a moving object in a vehicle body assemble line using air pressure.

A moving device according to an exemplary embodiment of the present invention can include a driving unit comprising a rotary shaft that is rotatable in a forward direction and a reverse direction by air pressure and a power delivery unit connected to the rotary shaft and adapted and configured to convert rotary motion of the rotary shaft to linear motion.

The device can further include an encoder connected with the driving unit, the encoder adapted and configured to detect rotational speed of the rotary shaft.

The driving unit can further include a case of which the rotary shaft is rotatably disposed thereto, at least one rotor connected to the rotary shaft within the case, a first air inlet which is disposed on a first side of the case, the first air inlet adapted and configured to supply compressed air to one side of the rotor for the rotary shaft to rotate in the forward direction and a second air inlet which is disposed on a second side of the case, the second air inlet adapted and configured to supply compressed air to the other side of the rotor for the rotary shaft to rotate in the reverse direction.

The rotor can include a body portion fixed to the rotary shaft and a plurality of blades connected to an exterior circumference of the body portion.

The power delivery unit can include a ball screw connected to the rotary shaft, a rail assembly comprising guide rails where the ball screw is disposed there between and a slider coupled to the ball screw and slidably mounted to the guide rail.

The power delivery unit can further include a moving member connected to the slider, wherein the moving member can be connected to a moving object.

The moving device can be applied to a jig system adapted and configured to arrange constituent elements for a vehicle body.

A moving device according to another exemplary embodiment of the present invention can include a driving unit comprising a rotary shaft that is rotatable in a forward direction and a reverse direction by air pressure; a power delivery unit connected to the rotary shaft and adapted and configured to convert rotary motion of the rotary shaft to linear motion; and a brake unit which connects the driving unit and the power delivery unit and selectively brakes the driving unit according to electrical signal.

The driving unit can further include: a case of which the rotary shaft is rotatably disposed thereto; at least one rotor connected to the rotary shaft within the case; a first air inlet disposed on a first side of the case, the first air inlet adapted and configured to supply compressed air to one side of the rotor for the rotary shaft to rotate in the forward direction; and a second air inlet disposed on a second side of the case, the second air inlet adapted and configured to supply compressed air to the other side of the rotor for the rotary shaft to rotate in the reverse direction.

A moving device according to an exemplary embodiment of the present invention can include a driving unit comprising a rotary shaft which is rotatable to normal direction and reverse direction by air pressure, a power delivery unit connected to the rotary shaft and converting rotary motion of the rotary shaft to linear motion and a brake unit which connects the driving unit and the power delivery unit and selectively brakes the driving unit according to electrical signal.

The driving unit can further include a case of which the rotary shaft is rotatably disposed thereto, at least one rotor connected to the rotary shaft within the case, a first air inlet which is disposed to one side of the case, and supplies compressed air to one side of the rotor for the rotary shaft to rotate to normal direction and a second air inlet which is disposed to the other side of the case, and supplies compressed air to the other side of the rotor for the rotary shaft to rotate to reverse direction.

The power delivery unit can include a ball screw connected to the rotary shaft, a rail assembly comprising guide rails where the ball screw is disposed there between and a slider coupled to the ball screw and slidably mounted to the guide rail.

The power delivery unit can further include a moving member connected to the slider, wherein the moving member can be connected to a moving object. The rail assembly can include a body where the guide rail is mounted thereto, and at least one guider adapted and configured to guide the moving member.

The brake unit can include a connecting member mounted to a brake housing and, which connects the rotary shaft and the ball screw, a rotary plate mounted to the connecting member, a brake pad movably disposed to the brake housing corresponding to the rotary plate, a return spring that is supported by the brake housing and supplies elastic force to the brake pad and a field coil portion mounted to the housing corresponding to the brake pad.

The brake housing can be provided with a plurality of guide member supporting the brake pad.

The brake pad can be applied to the rotary plate by means of the return spring so as to brake the rotary plate when the field coil portion is not magnetized.

The field coil portion can produce magnetic force, separate the brake pad from the rotary plate and release the braking of the rotary plate when the field coil portion is magnetized by the electrical signal.

The moving device according to an exemplary embodiment of the present invention can be applied to a jig system adapted and configured to arrange constituent elements for a vehicle body.

The moving device according to an exemplary embodiment of the present invention can be adapted to move a moving object in a vehicle body assembly line using air pressure.

And thus the moving device according to an exemplary embodiment of the present invention can be simplified in scheme and reduce cost for plant and equipment investment.

DEFINITIONS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The drawings illustrate exemplary embodiments of the present invention and are not construed to limit any aspect of the invention.

FIG. 6 is a drawing showing operations of a brake unit applied to a moving device according to an exemplary embodiment of the present invention.

Figure 1:
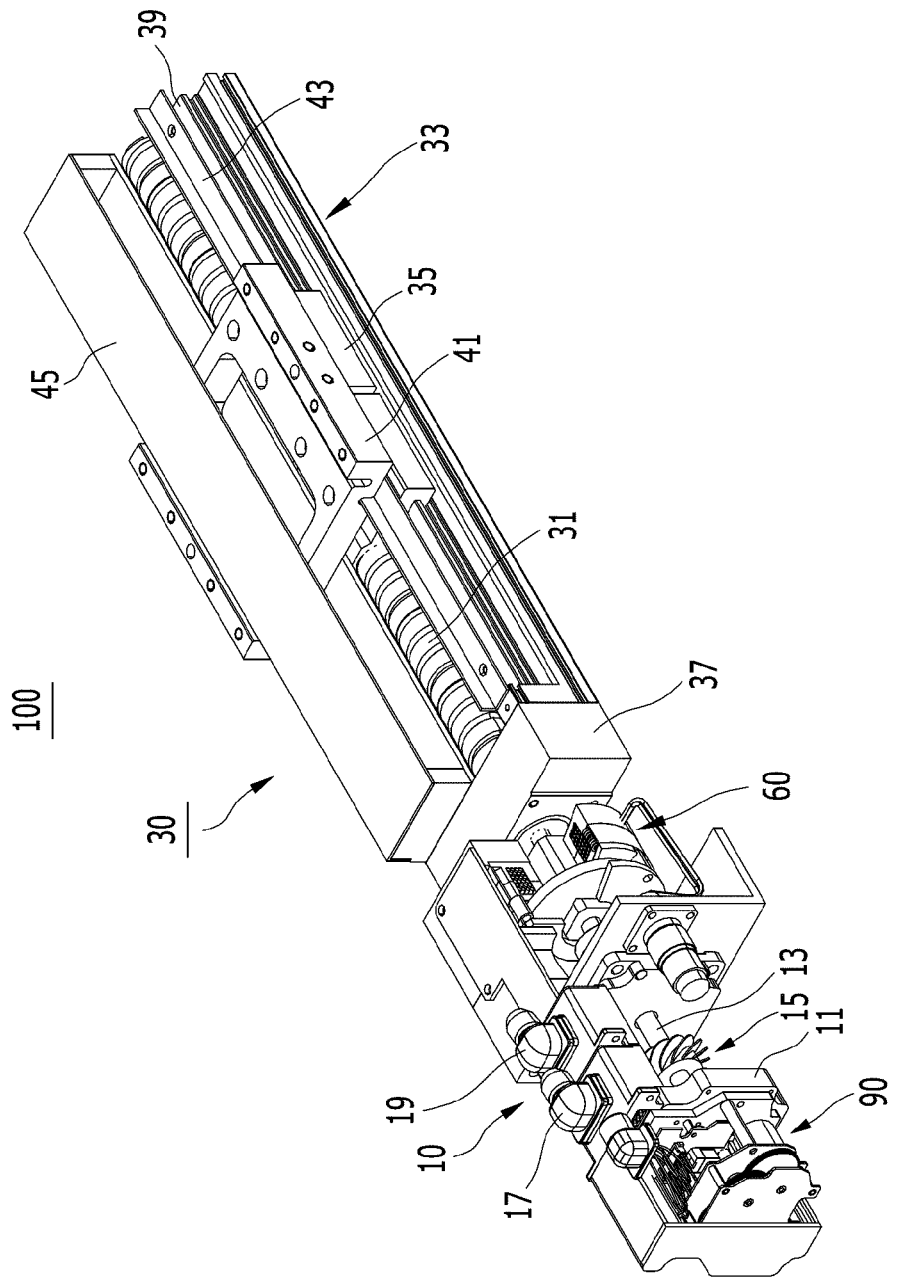
FIG. 1 and FIG. 2 are partially cut-away perspective views of a moving device according to an exemplary embodiment of the present invention.

The following list of reference characters is provided for the reader's convenience:

| | |
|---|---|
| 10: driving unit | 11: case |
| 13: rotary shaft | 15: rotor |
| 17: first air inlet | 19: second air inlet |
| 21: body portion | 22: blade |
| 30: power delivery unit | 31: ball screw |
| 33: rail assembly | 35: slider |
| 37: body | 39: guide rail |
| 41: moving member | 43: first guider |
| 45: second guider | 60: brake unit |
| 61: brake housing | 63: connecting member |
| 65: rotary plate | 67: brake pad |
| 69: return spring | 71: field coil portion |
| 73: guide member | 75: spring insert groove |
| 76: coil case | 79: coil |
| 90: encoder | |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments can be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings can differ from real size and real thickness of the components for better comprehension and ease of description. Therefore, the present invention is not limited to those shown in the drawings.

Figure 2:
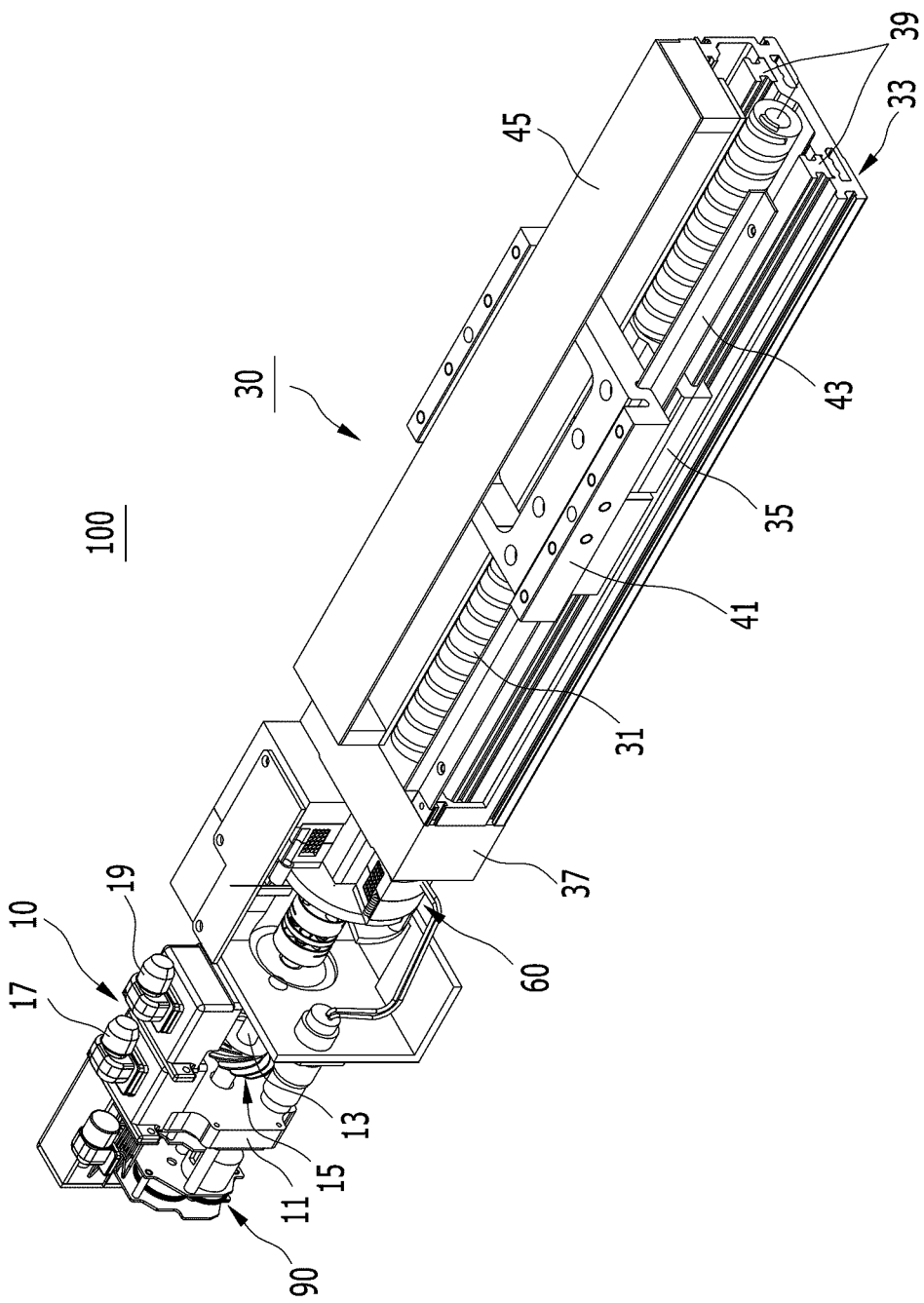
Figure 3:
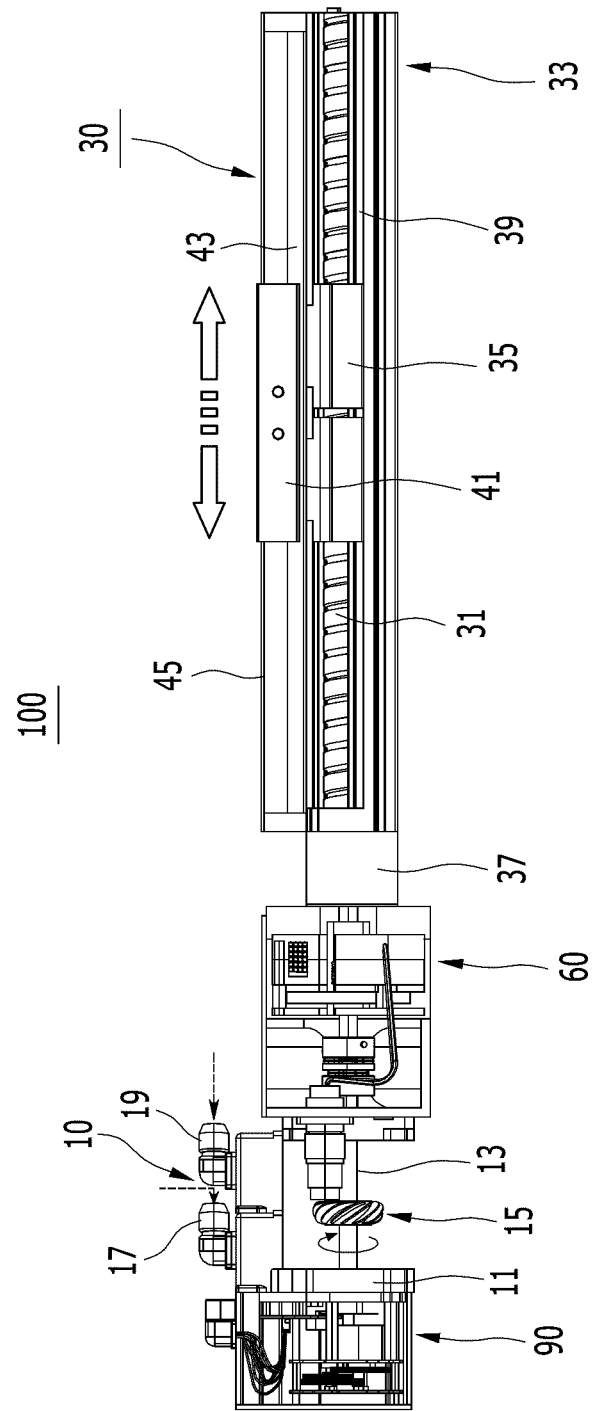
FIG. 3 is a partially cut-away perspective front view of a moving device according to an exemplary embodiment of the present invention.

FIG. 1 and FIG. 2 are partially cut-away perspective views of a moving device according to an exemplary embodiment of the present invention, and FIG. 3 is a partially cut-away perspective front view of a moving device according to an exemplary embodiment of the present invention.

Referring to FIG. 1 to FIG. 3, a moving device 100 according to an exemplary embodiment of the present invention can be adapted for a vehicle body assemble line where welding and sealing processes are proceeded.

For example, in the vehicle body assemble line, a jig system is provided for arranging vehicle body elements such as a tail gate panel, a trunk lead panel and so on.

The moving device 100 according to an exemplary embodiment of the present invention is adapted for a jig system and moves a common jig for various vehicle body elements of various vehicle models to be reciprocated.

The moving device 100 can use air pressure as driving source and thus can reduce manufacturing cost and holding cost.

The moving device 100 according to an exemplary embodiment of the present invention basically includes a driving unit 10, a power delivery unit 30, a brake unit 60 and an encoder 90 and each element will be described as follows.

The driving unit 10 according to an exemplary embodiment of the present invention can produce torque using compressed air.

The driving unit 10, as shown in FIG. 1 to FIG. 4, includes a case 11, a rotary shaft 13, a rotor 15, a first air inlet 17 and a second air inlet 19.

The case 11 forms a predetermined inner space and the rotary shaft 13 rotatably disposed within the case 11. The rotary shaft 13 is rotatable to normal direction and reverse direction by air pressure.

The rotor 15 receives the compressed air and rotates the rotary shaft 13 and is disposed within the case 11 and connected with the rotary shaft 13.

Figure 4:
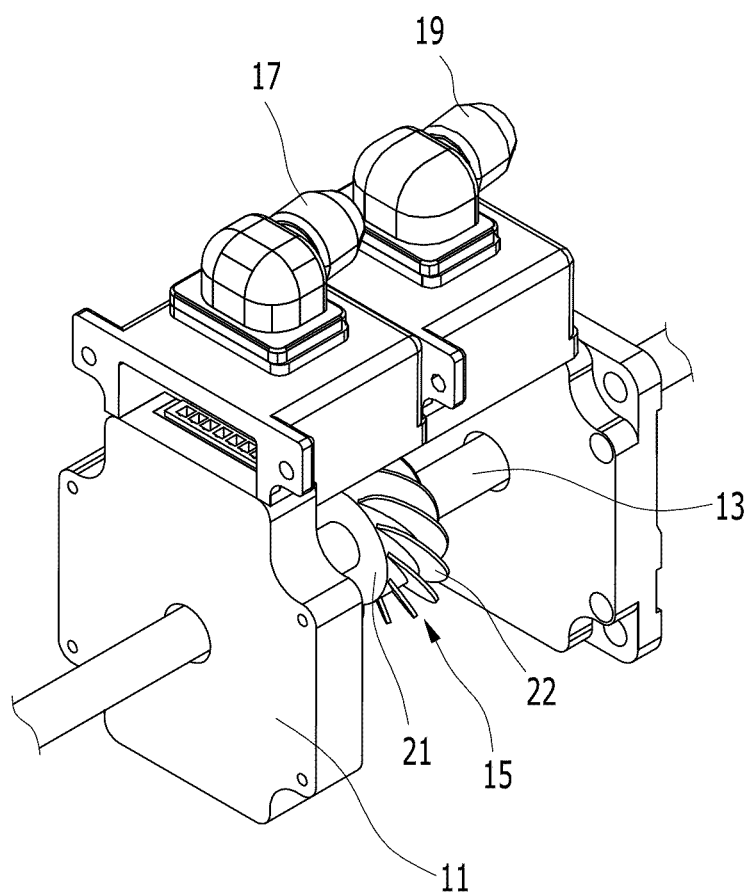
FIG. 4 is a drawing showing a driving unit applied to a moving device according to an exemplary embodiment of the present invention.

The rotor 15, referring to FIG. 4, includes a body portion 21 connected to the rotary shaft 13 and a plurality of blades 22 protruded from an exterior circumference of the body portion 21.

The first air inlet 17 is disposed one side of the case corresponding to one side of the rotor 15 and supplies compressed air to one side of the rotor 15 for the rotor 15 to be rotated to normal direction.

The second air inlet 19 is disposed the other side of the case corresponding to the other side of the rotor 15 and supplies compressed air to the other side of the rotor 15 for the rotor 15 to be rotated to reverse direction.

The first and the second air inlet 17 and 19 can be connected to an air supply line (not shown) and an air compressor (not shown).

In an exemplary embodiment of the present invention, the power delivery unit 30 is adapted to convert rotary motion of the rotary shaft 13 to linear motion.

The power delivery unit 30 is called as "LM guide" and includes a ball screw 31, a rail assembly 33 and a slider 35.

The ball screw 31 is connected with the rotary shaft 13, and rotatable to normal direction and reverse direction at a body 37 of a rail assembly 33 (which will be described later).

The rail assembly 33 includes the body 37 and a pair of guide rail 39. The body 37 rotatably supports the ball screw 31 connected with the rotary shaft 13.

The pair of guide rails 39 is mounted to a lower portion of the body 37 and parallel to the body 37 and the ball screw 31 is interposed therebetween.

The slider 35 is coupled to the ball screw 31 and slidable to the guide rail 39.

When the driving unit 10 is operated and the ball screw 31 rotates to normal direction or reverse direction, the slider 35 slides along the guide rail 39 on the ball screw 31.

A moving member 41 is mounted to a slider 35. The moving member 41 can be connected with a moving object.

When the slider 35 moves along the guide rail 39, the moving member 41 slides along the rail assembly 33.

A first and the second guider 43 and 45 for guiding the moving member 41 are mounted to the rail assembly 33.

The first guider 43 supports a lower portion of the moving member 41 and is parallel to the guide rail 39.

The second guider 45 supports a higher portion of the moving member 41, and is parallel to the guide rail 39.

In an exemplary embodiment of the present invention, the brake unit 60 is adapted to brake operation of the driving unit 10 in cases of power downing during operation of the driving unit 10, emergency situations, braking the driving unit 10 when the object is positioned at a predetermined position, and so on.

The brake unit 60 selectively cuts off the torque of the driving unit 10 by means of electrical signal.

Figure 5:
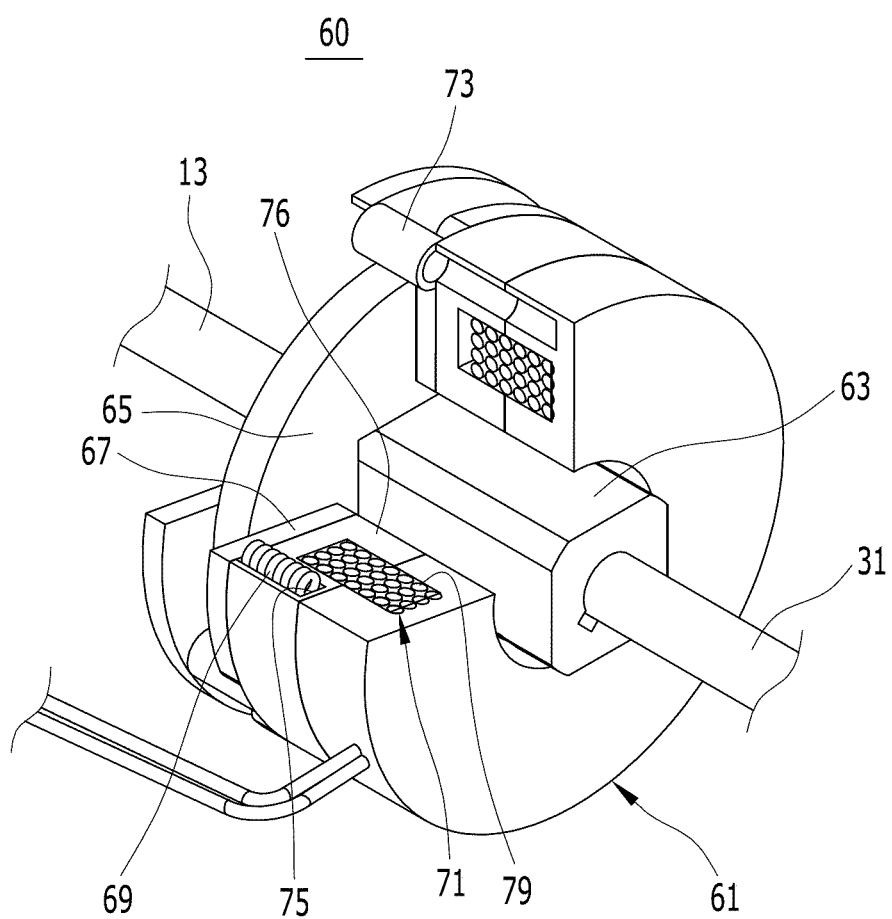
FIG. 5 is a drawing showing a brake unit applied to a moving device according to an exemplary embodiment of the present invention.

The brake unit 60, as shown in FIG. 5, includes a brake housing 61, a connecting member 63, a rotary plate 65, a brake pad 67, a return spring 69 and a field coil portion 71.

The brake housing 61 is disposed between the case 11 of the driving unit 10 and the body of the rail assembly 33.

The connecting member 63 connects the rotary shaft 13 and the ball screw 31, and is disposed rotatably to the brake housing 61 and one end of which is connected to the rotary shaft 13 and the other end of which is connected to the ball screw 31.

The rotary plate 65 is mounted to the connecting member 63 and the brake pad 67 selectively frictionally contacts thereto.

The brake pad 67 selectively contacts the rotary plate 65 so as to selectively brake the driving unit 10 or is separated from the rotary plate 65 so as release braking of the driving unit 10.

The brake pad 67 is movably disposed to the brake housing 61 corresponding to the rotary plate 65.

The brake pad 67 is movable within the brake housing 61 being guided by a plurality of guide member 73. The guide member 73 is mounted to the brake housing 61 and supports movement of the brake pad 67.

The return spring 69 supplies elastic force to the brake pad 67 within the brake housing 61.

The return spring 69 can be a coil spring and is inserted into a spring insert groove 75 formed to the brake housing 61. One end of the return spring 69 is supported by the brake pad 67 and the other end of which is supported by the spring insert groove 75.

The field coil portion 71 produces magnetic force by means of electric power and is disposed within the brake housing 61 corresponding to the brake pad 67.

The field coil portion 71 includes a coil 79 which can be magnetized by the supplied electric power and a coil case 76.

When the field coil portion 71 is not magnetized, the brake pad 67 sticks to the rotary plate 65 by means of the elastic force of return spring 69 and brakes rotation of the rotary plate 65.

When the field coil portion 71 is magnetized by the supplied electric power, the brake pad 67 is separated from the rotary plate 65 and releases the braking of the rotary plate 65.

In an exemplary embodiment of the present invention, the encoder 90, as shown in FIG. 1 to FIG. 3, detects rotation speed of rotary shaft 13.

The encoder 90 is disposed to the case 11 of the driving unit 10 and connected with the rotary shaft 13.

The encoder 90 can be a servo control device which includes a rotation slit provided with a light-emitting element and a light-receiving element and a fixed slit.

The encoder 90 can be a servo control device detecting and controlling rotation speed of a motor and is obvious to a person skilled in the art and thus detailed description will be omitted in the specification.

Hereinafter, operations of the moving device 100 of an exemplary embodiment of the present invention will be described referring to the drawings.

As shown in A of FIG. 6, the field coil portion 71 of the brake unit 60 produces magnetic force by receiving electric power according to control signal.

The field coil portion 71 produces the magnetic force when the coil 79 receives the electric power and the magnetic force magnetizes the coil case 76.

Then the brake pad 67 of the brake unit 60 is separated from the rotary plate 65 by the magnetic force of the field coil portion 71.

In this case, the brake pad 67 is guided by the guide member 73 and moves to stick to the coil case 76.

In the state of releasing the braking of the brake pad 67 to the rotary plate 65, the compressed air is supplied to one side of the rotor 15 though the first air inlet 172 of the driving unit 10. Thus, the rotary shaft 13 rotates to normal direction by the supplied air. As a result, the ball screw 31 of the power delivery unit 30 rotates to the normal direction by the rotation of the rotary shaft 13 and the rotary motion of the rotary shaft 13 is converted to the linear motion by the power delivery unit 30. Then the slider 35 moves along guide rail 39 on the ball screw 31 and the moving member 41 connected with the slider 35 moves along the first and the second guider 43 and 45 to normal direction.

When the moving object should be moved in the opposite direction, the compressed air is supplied to the other side of the rotor 15 though the second air inlet 19. Thus, the rotary shaft 13 rotates in the reverse direction. As a result, the ball screw 31 rotates to the reverse direction by the rotation of the rotary shaft 13 of the power delivery unit 30 and the power delivery unit 30 converts the rotary motion of the rotary shaft 13 to linear motion. Then the slider 35 moves along guide rail 39 on the ball screw 31 and the moving member 41 connected with the slider 35 moves along the first and the second guider 43 and 45 to the opposite direction.

So, in an exemplary embodiment of the present invention, the moving object connected with the moving member 41 moves reciprocally.

In the case of emergency or positioning the object at a predetermined position, the operation of the driving unit 10 can be stopped.

When the electric power supplied to the field coil portion 71 is cut off, as shown in B of FIG. 6, the brake pad 67 sticks to the rotary plate 65 by the elastic force of the return spring 69 so as to stop the rotary shaft 13.

The moving device 100 according to an exemplary embodiment of the present invention can generate torque and convert rotary motion to linear motion using air pressure so as to move the object to a predetermined position.

Using compressed air as driving source, the moving device 100 can be simplified in scheme and can reduce manufacturing cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A moving device comprising:
    a driving unit comprising a rotary shaft that is rotatable in a forward direction and a reverse direction by air pressure;
    a power delivery unit connected to the rotary shaft and adapted and configured to convert rotary motion of the rotary shaft to linear motion; and
    a brake unit which connects the driving unit and the power delivery unit and selectively brakes the driving unit according to an electrical signal,
    wherein the power delivery unit comprises:
        a ball screw connected to the rotary shaft;
        a rail assembly comprising guide rails where the ball screw is disposed there between; and
        a slider coupled to the ball screw and slidably mounted to the guide rail, and wherein the brake unit comprises:
        a connecting member mounted to a brake housing and, which connects the rotary shaft and the ball screw;
        a rotary plate mounted to the connecting member;
        a brake pad movably disposed to the brake housing corresponding to the rotary plate;
        a return spring that is supported by the brake housing and supplies elastic force to the brake pad; and
        a field coil portion mounted to the housing corresponding to the brake pad.

2. The moving device of claim 1, wherein the driving unit further comprises:
    a case of which the rotary shaft is rotatably disposed thereto;
    at least one rotor connected to the rotary shaft within the case;
    a first air inlet disposed on a first side of the case, the first air inlet adapted and configured to supply compressed air to one side of the rotor for the rotary shaft to rotate in the forward direction; and
    a second air inlet disposed on a second side of the case, the second air inlet adapted and configured to supply compressed air to the other side of the rotor for the rotary shaft to rotate in the reverse direction.

3. The moving device of claim 1, wherein the power delivery unit further comprises a moving member connected to the slider, wherein the moving member is connected to a moving object.

4. The moving device of claim 3, wherein the rail assembly comprises a body, guide rail is mounted thereto, and at least one guider is adapted and configured to guide the moving member.

5. The moving device of claim 1, wherein the brake housing is provided with a plurality of guide members supporting the brake pad.

6. The moving device of claim 1, wherein the brake pad is applied to the rotary plate by means of the return spring so as to brake the rotary plate when the field coil portion is not magnetized.

7. The moving device of claim 1, wherein the field coil portion produces magnetic force, separates the brake pad from the rotary plate and releases the braking of the rotary plate when the field coil portion is magnetized by the electrical signal.

8. The moving device of claim 1, wherein the moving device is applied to a jig system adapted and configured to arrange constituent elements for a vehicle body.

* * * * *